United States Patent [19]

Nakamura

[11] Patent Number: 4,840,492
[45] Date of Patent: Jun. 20, 1989

[54] ROTATIONAL SCREW FOR MIXING

[76] Inventor: Kensaku Nakamura, 272-1 Bessho-cho, Matsubara-shi, Osaka, Japan

[21] Appl. No.: 185,493

[22] Filed: Apr. 25, 1988

[51] Int. Cl.$^4$ .............................. B01F 7/08; B29B 7/42
[52] U.S. Cl. ........................................ 366/81; 366/88; 366/89; 366/319; 366/323
[58] Field of Search ............... 366/81, 75, 90, 99, 366/79, 318, 319, 324, 343, 325, 82, 83, 84, 85, 86, 87, 88, 89, 322, 323; 425/205, 208, 209

[56] References Cited

U.S. PATENT DOCUMENTS

| | | | |
|---|---|---|---|
| 3,006,029 | 10/1961 | Saxton | 366/90 |
| 3,687,423 | 8/1972 | Koch et al. | 366/81 |
| 3,737,151 | 6/1973 | Schaeffer et al. | 366/75 |
| 3,917,507 | 11/1975 | Skidmore | 366/75 X |
| 3,985,348 | 10/1976 | Skidmore | 366/75 |
| 3,998,438 | 12/1976 | Sokolow | 366/81 |
| 4,045,401 | 8/1977 | Stenmark et al. | 366/90 X |
| 4,060,226 | 11/1977 | Schweller | 366/75 |
| 4,107,788 | 8/1978 | Anders | 366/90 X |
| 4,639,143 | 1/1987 | Frankland, Jr. | 366/90 X |
| 4,695,165 | 9/1987 | Fukumizu et al. | 366/90 |

*Primary Examiner*—Harvey C. Hornsby
*Assistant Examiner*—Scott J. Haugland
*Attorney, Agent, or Firm*—Moonray Kojima

[57] ABSTRACT

The present invention relates to a rotation screw for mixing, for use with an extruder for forming by forcing out a volume of synthetic resin or a mixture of synthetic resin with additives including glass or carbon fiber, calcium carbonate, etc, having a series of centrally situated mixing recesses of large width and a plurality of mixing recesses of small width arranged on both sides of said wide mixing recesses, both of which are helically formed, in specified mixing positions, in the periphery of the rotational screw, arranged in helically adjoined relationship, and partially communicated transversely of the helical direction with one another so that the amount of delivery becomes great and the highly intimate mixing can be effected.

3 Claims, 3 Drawing Sheets

ROTATIONAL SCREW FOR MIXING

BACKGROUND OF THE INVENTION

Rotational screws for mixing in the prior art have been introduced; particularly that of barrier type is disclosed in U.S. Pat. No. 3486192 (See FIG. 6); and that of damflight type is disclosed in Japanese Unexamined Patent Publication No. 11505/1967 (see FIG. 7).

The barrier type screw 60, of the former, has a mixing portion 62 thereof which is equal to flight portions thereof in diameter and provided in the central region of a screw shaft 61. On the periphery of the mixing portion 62 there are a plurality of axially extending mixing recesses 63. In operation with this barrier type screw 60, while material supplied into the mixing recesses 63 is transported in the axial direction as the screw shaft 61 rotates, a portion of the material moves in a direction opposite to the rotating direction of the screw shaft 61 and will flow into the nearest recess 63 situated in a circumferential direction. This causes the material to flow disorderly in two directions on the mixing portion 62 and thus, to be prevented from uniformly mixing with additives.

The dam-flight type screw 70, of the latter, has a lead of main flight 72 disposed on a screw shaft 71 thereof and also, a lead of auxiliary flight 73 having a large distance or pitch. In addition, a mixing portion 74 of the screw 70 is formed such that the distance between the flights 72 and 73 becomes narrow in the transporting direction. Thereby, as the screw shaft 71 rotates, a portion of material moves across the auxiliary flight 73 and will be joined with the flow of material moving along the back side of the auxiliary flight 73. However, this action does not result in continuous and appropriate mixing of the material, but only in agitation of the same with both of the flights 72 and 73. It will then be difficult to provide a uniform mixture of material constantly by intimately mixing the material with additives in the arrangement.

OBJECT OF THE INVENTION

It is a primary object of the present invention to provide a rotational screw for mixing having a multiplicity of centrally situated wide mixing recesses and a multiplicity of narrow mixing recesses arranged on both sides of the wide mixing recesses, both of which are helically formed, in specified mixing positions, in the periphery of the rotational screw, so that molten resin material in feeding can be agitated positively and comingled uniformly for highly intimate mixing and additionally, the amount of delivery becomes great.

It is another object of the present invention to provide a rotational screw for mixing in which the height of each of projections located on both ends of the mixing recess is arranged so that it can be the same in outer diameter as the rotational screw whereby the highly intimate mixing can be performed.

It is a further object of the present invention to provide a rotational screw for mixing in which the height of each of projections located on both ends of the mixing recess is arranged so that it can be slightly smaller in outer diameter than the rotational screw whereby the amount of delivery becomes great and the appropriate mixing can be performed according to the purpose of use.

Other objects of the present invention will be apparent from the following description of preferred embodiments.

BRIEF DESCRIPTION OF THE DRAWINGS

The drawings illustrate preferred embodiments according to the present invention, in which.

DESCRIPTION OF THE PREFERRED EMBODIMENTS

Preferred embodiments of the present invention will be described in detail in conjunction with the drawings.

Figure 1:
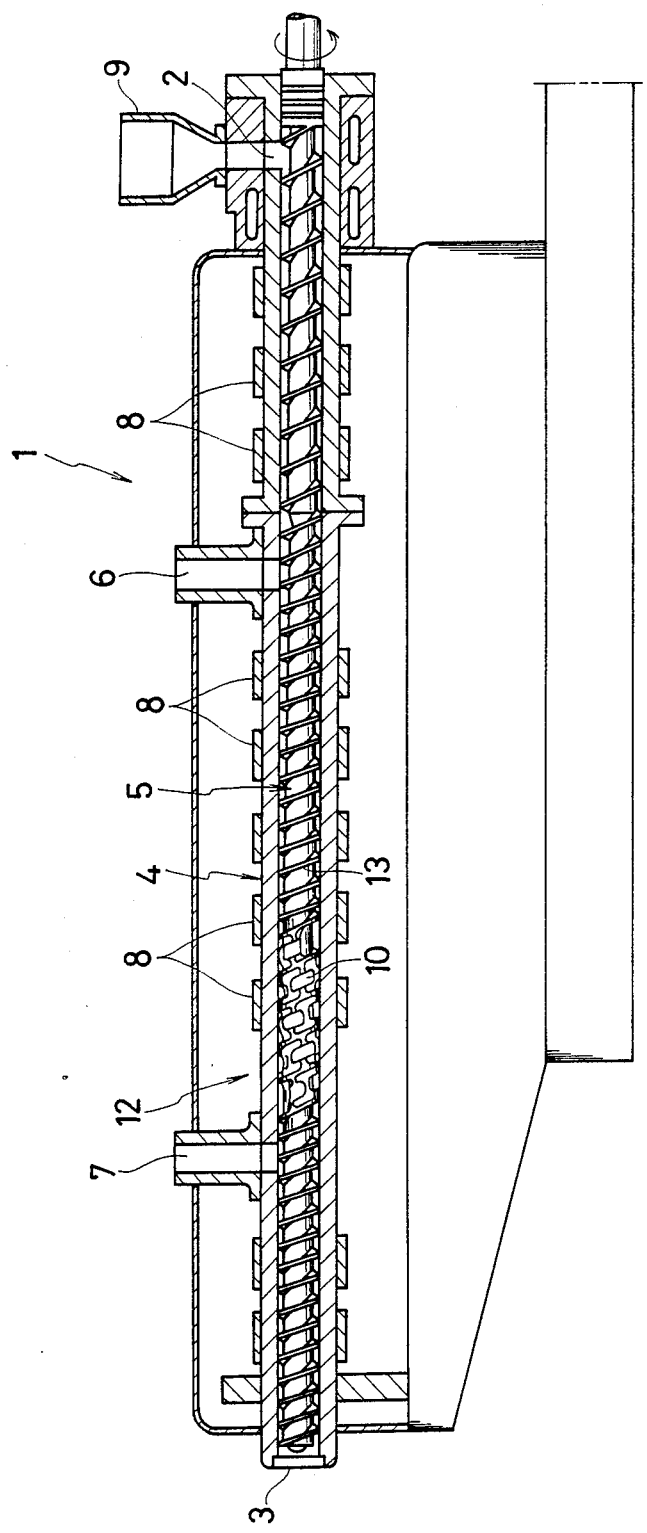
FIG. 1 is a longitudinal sectional side view of an extruder.

Each of the drawings illustrates a rotational screw for mixing employed in an extruder for bringing a mixture of granular polypropylene resin with additives including calcium carbonate and talc into a shape by extrusion forming. As shown in FIG. 1, an extruder 1 comprises a heating cylinder 4 having at one end a feeder inlet 2 for feeding material and at the other end an extruder outlet 3 and a rotational screw 5 mounted within the heating cylinder 4 for transporting material supplied into the cylinder 4 from the feeder inlet 2 to the extruder outlet 3.

The heating cylinder 4 has a first vent opening 6 and second vent opening 7 provided thereon for deaeration and a plurality of band heaters 8 mounted on the pheriphery thereof, as shown in FIG. 1.

The feeder inlet 2 is communicated with a material supplying hopper 9 disposed thereabove, whereby a determined amount of granular material supplied into the hopper 9 flows downward into the heating cylinder 4.

The rotational screw 5 has a multiplicity of wide mixing recesses 10 and a multiplicity of narrow mixing recesses 10, both of which are formed helically in the periphery the screw 5, at the inlet 2 side thereof and adjacent to the second vent opening 7, so as to form a mixing portion 11 for mixing material.

Figure 3:
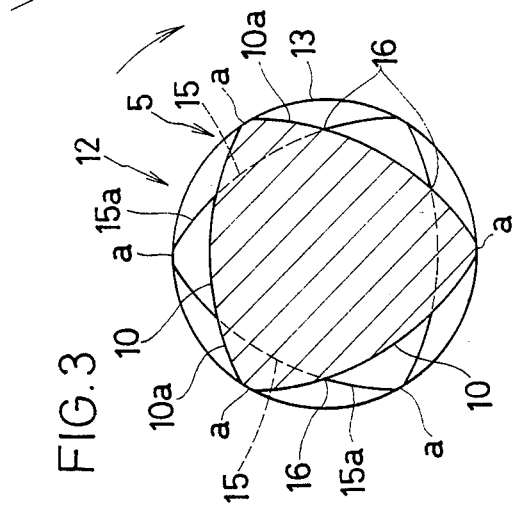
FIG. 3 is a cross sectional view taken on the line III—III of FIG. 2.

Particularly, the wide mixing recesses 10 are formed in the periphery of a mixing portion 12 which has the same outer diameter as the rotational screw 5 or a flight land 13, so that each of them extends in the helical direction through an angle of about 120 degrees. More specifically, the mixing recess 10 is formed in the periphery of the rotational screw 5 in centripetal relationship so that a radius of the wide arcuate bottom thereof is greater than a curvature radius relative to the optimum outer diametral measurement of the rotational screw 5, as shown in FIG. 3.

Furthermore, the depth of the wide mixing recess 10 is optimum in the central region from which its bottom becomes raised gradually toward both the ends in the helical directions thus to provide a helically moderately sloping recess.

The narrow mixing recesses 14 and 15 are arranged helically on both the sides of the centrally situated wide mixing recesses 10 in such a way that each of the narrow recesses is spaced about 60 degrees circumferentially from the respective wide recess. Specifically, the adjacent wide and narrow mixing recesses 10 and 14, 15 are adjoined, at side ends, with each other so as to form a plurality of flow pathes 16 for molten resin at their joints.

In addition, there are partitions a remaining respectively between the helically consecutive mixing recesses 10, 14, 15. The height of the partition is arranged so as to be equal to the outer diameter of the rotational screw.

The operation of processing a mixture of granular polypropylene resin with additives including calcium carbonate and talc by the extruder 1 having such an arrangement is as follows:

As shown in FIG. 1, a specified amount of mixed material which has been supplied into the hopper 9, flows downward into the heating cylinder 4 and is then transported continuously toward the extruder outlet 3 as the rotational screw 5 rotates in a direction represented by the arrow.

During the transferring of material to the extruder outlet 3, the material is heated by the band heaters 8 and comes into a molten state. After deaeration through the first vent opening 6, the material reaches the mixing portion 12 provided in the rear portion of the rotational screw 5.

The molten material is further transported as passing through the wide and narrow mixing recesses 10, 14, 15 where the flow of material will become turbulent in pulsating movement.

More specifically, in the material will be divided leftward and rightward into a number of streams in the narrow mixing recesses 14, 15 upon moving across the flow paths 16 through the wide and narrow mixing recesses 10, 14, 15 and then joined upon moving into the proceeding wide mixing recesses 10. This fluidly mixing action and the compressing action caused at the helically rearward situated bottoms 10a, 14a, 15a of the respective mixing recesses 10, 14, 15 are repeatedly performed.

Consequently, the material can be agitated positively and mixed uniformly through the fluidly pulsating turbulence caused when the flow passes the wide and narrow mixing recesses 10, 14, 15 formed in the periphery of the rotationa screw 5, the zigzag flow movement effected forcedly through the wide and narrow mixing recesses 10, 14, 15, and the compressing action caused at the bottoms of the respective mixing recesses.

Additionally, the height of the partitions a between the mixing recesses 10, 14, 15 is arranged so as to be equal to the outer diameter of the flight land 13 whereby the highly improved mixing can be effected.

Figure 5:
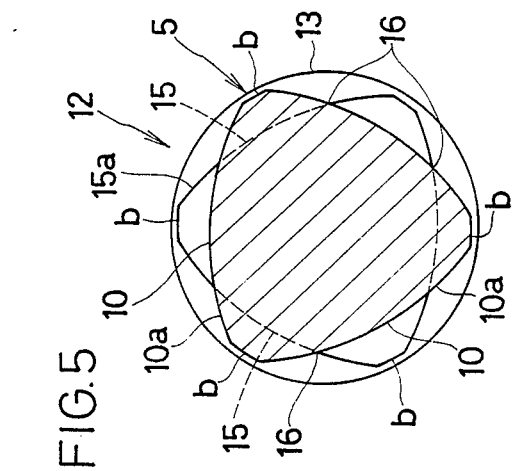
FIG. 5 is a cross sectional view taken on the line V—V of FIG. 4.
Figure 4:
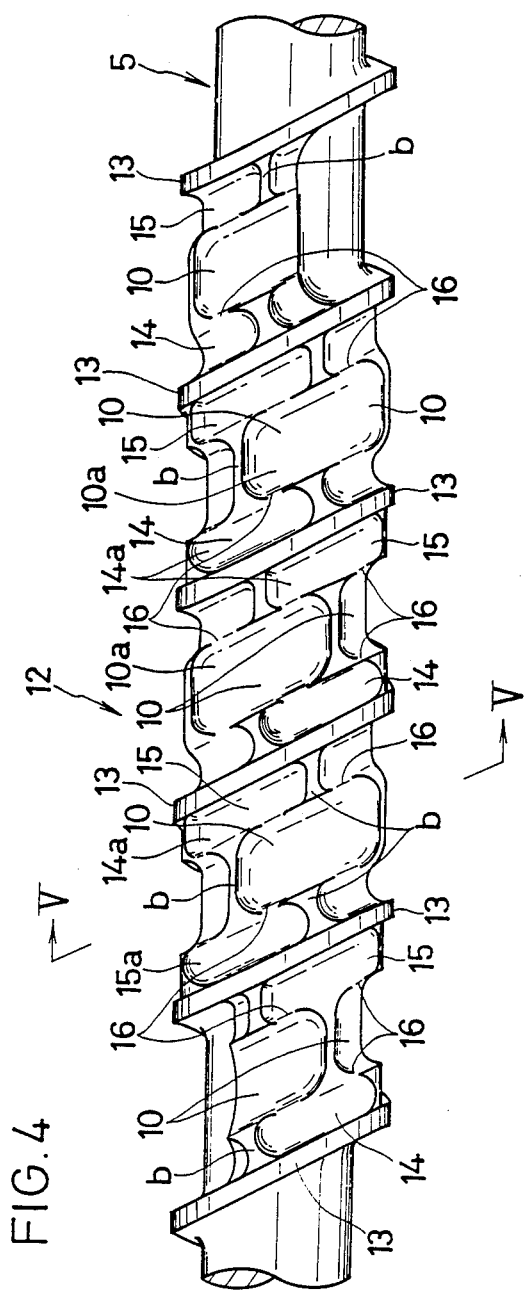
FIG. 4 is a side view showing a further embodiment in the form of a rotational screw.
Figure 6:
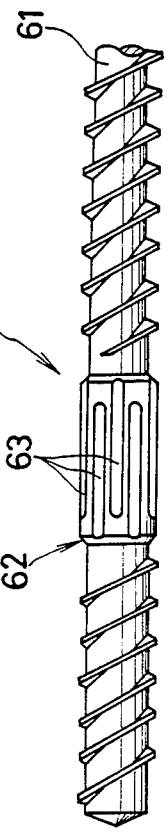
FIG. 6 is an explanatory view of a prior art barrier type screw.
Figure 7:
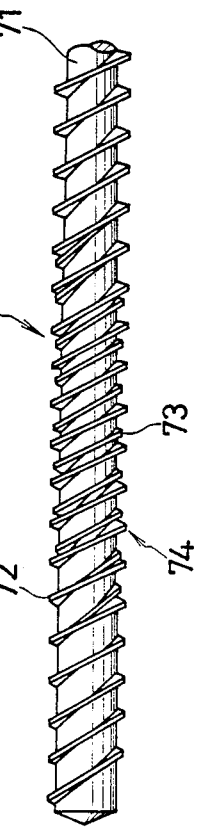
FIG. 7 is an explanatory view of a prior art dam flight type screw.

FIGS. 4 and 5 illustrate another embodiment of a rotational screw for mixing.

This rotational screw 5 is arranged so that the height of partitions b provided in the front and rear ends of the mixing recesses 10, 14, 15 is slightly less as compared to the outer diameter of the flight lands 13.

Figure 2:
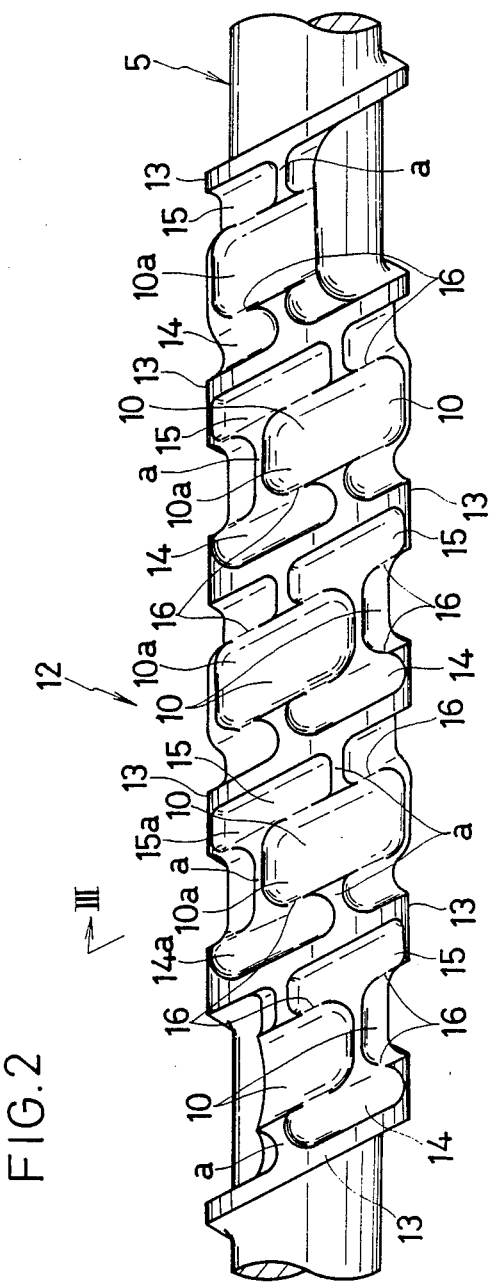
FIG. 2 is an enlarged side view of the main part of a rotational screw.

According to such an arrangement, the amount of delivery can be increased and additionally, the appropriate mixing corresponding to the purpose of use will be effected. While this embodiment is similar to the first embodiment in the other aspects, a detailed description on the embodiment will be omitted as similar numerals in FIGS. 2 and 3 represent similar components of FIGS. 4 and 5.

Each of the mixing recesses 10, 14, 15 formed in the rotational screw 5 may be extended helically to a length through 180 degrees responding to a degree of the mixing of material. Accordingly, the present invention is not limited to the arrangements of the aforesaid embodiments.

What is claimed is:

1. A rotary mixing screw comprising
   a circular cylindrical solid rod having on the outer periphery there of
   a pair of first recesses arranged substantially parallel to each other and substantially helically about an axis of the rod, said first recesses each forming a triangle having three tips and three rounded sides, each first recess being disposed to have its successive tips spaced at a 120° angle from each other said triangles being formed when considered from a helical cross section;
   said outer periphery of said rod having remaining portions adjacent said pair of first recesses; and
   a second recess formed between said pair of first recesses and arranged helically about said axis, said second recess forming a triangle with three tips and three rounded sides, with a tip being disposed at 60° angle from the closest tips of said pair of first recesses, said triangle being formed when considered from a helical cross section, said second recess having a wider dimension axially than said pair of first recesses; and
   wherein the areas adjacent to the pair of first recesses and said second recess, each have an opening to form a plurality of flow paths.

2. The screw of claim 1, wherein the tips of said first and second recesses are of a diameter equal to the outer diameter of the rotary mixing screw.

3. The screw of claim 1, wherein the tips of said first and second recesses are of a diameter slightly less than the outer diameter of the rotary mixing screw.

* * * * *